(12) United States Patent
Kawasaki et al.

(10) Patent No.: US 12,010,273 B2
(45) Date of Patent: Jun. 11, 2024

(54) WIRELESS TAG COMMUNICATION DEVICE, IMAGE FORMING APPARATUS, AND METHOD

(71) Applicant: TOSHIBA TEC KABUSHIKI KAISHA, Tokyo (JP)

(72) Inventors: Yuki Kawasaki, Numazu Shizuoka (JP); Takashi Tomiyama, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 17/891,183

(22) Filed: Aug. 19, 2022

(65) Prior Publication Data

US 2023/0145916 A1 May 11, 2023

(30) Foreign Application Priority Data

Nov. 11, 2021 (JP) .................................. 2021-184185

(51) Int. Cl.
*H04N 1/00* (2006.01)
*H01Q 15/24* (2006.01)
*H04N 1/23* (2006.01)

(52) U.S. Cl.
CPC ....... *H04N 1/00342* (2013.01); *H01Q 15/242* (2013.01); *H04N 1/2353* (2013.01)

(58) Field of Classification Search
CPC . H04N 1/00342; H04N 1/2353; H01Q 15/242
See application file for complete search history.

(56) References Cited

U.S. PATENT DOCUMENTS

| 10,025,960 | B1* | 7/2018 | Fink | H04L 5/08 |
| 2005/0094183 | A1* | 5/2005 | Kojima | H04N 1/00342 358/1.14 |
| 2006/0226987 | A1 | 10/2006 | Nagase | |
| 2007/0222608 | A1* | 9/2007 | Maniwa | G06K 7/10316 343/700 MS |
| 2009/0195804 | A1* | 8/2009 | Kojima | H04N 1/00342 358/1.9 |
| 2017/0257498 | A1* | 9/2017 | Okamoto | H04N 1/00702 |
| 2022/0374620 | A1 | 11/2022 | Kawasaki | |

* cited by examiner

*Primary Examiner* — Mohamed Barakat
(74) *Attorney, Agent, or Firm* — Amin, Turocy & Watson, LLP

(57) ABSTRACT

A wireless tag communication device includes an antenna, a first maximum value acquiring unit, a second maximum value acquiring unit, a first minimum value acquiring unit, a second minimum value acquiring unit, and a polarization direction determining unit. The wireless tag communication device acquires, for each of n wireless tags provided on a sheet, a maximum value $M1(k)$ of a received power intensity of the wireless tag when the radio wave is transmitted from the antenna to the sheet in a first polarization direction; acquires, for each of the wireless tags, a maximum value $M2(k)$ of a received power intensity of the wireless tag when the radio wave is transmitted from the antenna in a second polarization direction that is different from the first polarization direction; acquires a minimum value $m1$ of $M1(k)$; acquires a minimum value $m2$ of $M2(k)$; and determines the polarization direction along which one of $m1$ and $m2$ that is not smaller is acquired as the polarization direction of the radio wave transmitted to the sheet.

18 Claims, 14 Drawing Sheets

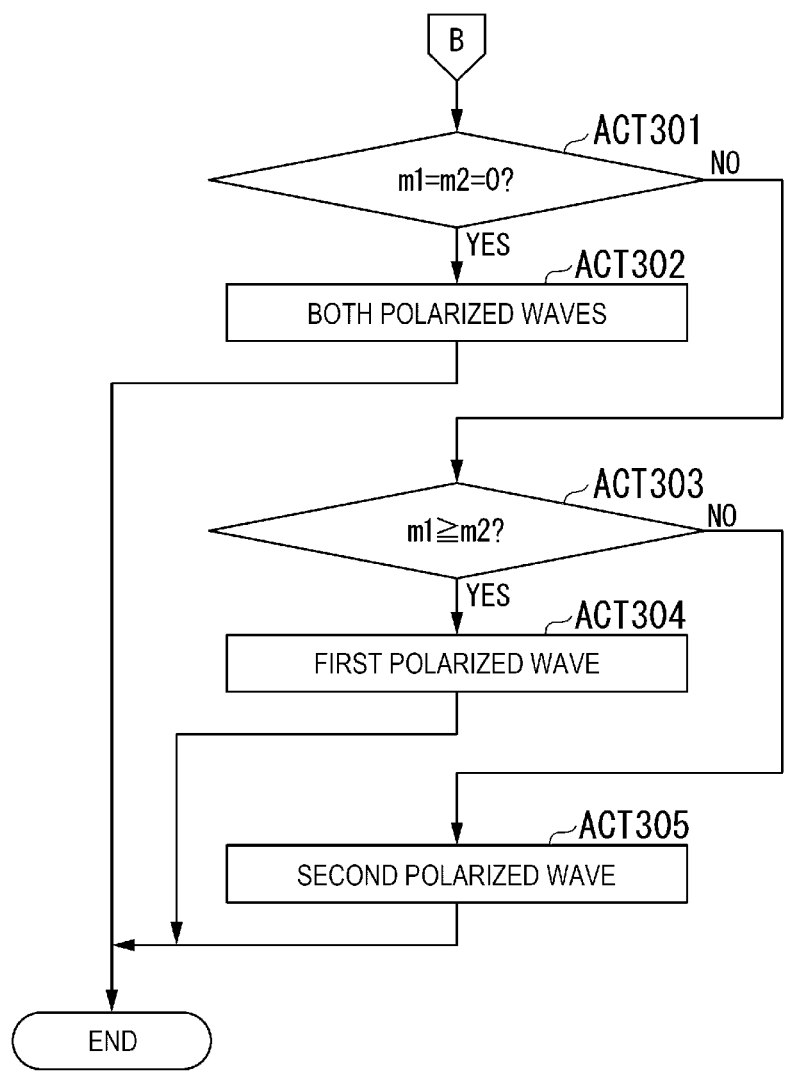

WIRELESS TAG COMMUNICATION DEVICE, IMAGE FORMING APPARATUS, AND METHOD

CROSS-REFERENCE TO RELATED APPLICATION

This application is based upon and claims the benefit of priority from Japanese Patent Application No. 2021-184185, filed on Nov. 11, 2021, the entire contents of which are incorporated herein by reference.

FIELD

Embodiments described herein relate to a wireless tag communication device, an image forming apparatus, and a method.

BACKGROUND

There is a wireless tag communication device capable of communicating with a sheet attached with a wireless tag, using radio frequency identifier (RFID) technique. In addition, there is an image forming apparatus including the wireless tag communication device.

Some wireless tag communication devices are capable of transmitting radio waves including two types of polarized waves to a sheet. In addition, there is a sheet provided with a plurality of wireless tags. When the radio wave is transmitted to the sheet on which the plurality of wireless tags are provided, stable communication can be performed by transmitting a radio wave including an appropriate polarized wave of the two types of polarized waves.

However, the appropriate polarized wave cannot be unconditionally determined but depends on positions on a sheet provided with the wireless tags, which may disable stable communication.

DESCRIPTION OF THE DRAWINGS

FIG. 13 is still another flowchart showing the flow.

DETAILED DESCRIPTION

In general, according to one embodiment, a wireless tag communication device, an image forming apparatus, and a method that are capable of performing stable communication with a plurality of wireless tags provided on one sheet are provided.

The wireless tag communication device according to the embodiment includes an antenna, a first maximum value acquiring unit, a second maximum value acquiring unit, a first minimum value acquiring unit, a second minimum value acquiring unit, and a polarization direction determining unit. The antenna can switch a polarization direction of a radio wave transmitted to a wireless tag. The first maximum value acquiring unit is configured to acquire, for each of n (n is an integer of 2 or more) wireless tags provided on a sheet, a maximum value $M1(k)$ (k=1 to n) of a received power intensity of the wireless tag when the radio wave is transmitted from the antenna to the sheet in a first polarization direction. The second maximum value acquiring unit is configured to acquire, for each of the wireless tags, a maximum value $M2(k)$ (k=1 to n) of a received power intensity of the wireless tag when the radio wave is transmitted from the antenna in a second polarization direction that is different from the first polarization direction. The first minimum value acquiring unit is configured to acquire a minimum value $m1$ of $M1(k)$ (k=1 to n). The second minimum value acquiring unit is configured to acquire a minimum value $m2$ of $M2(k)$ (k=1 to n). The polarization direction determining unit is configured to determine the polarization direction along which one of $m1$ and $m2$ that is not smaller is acquired as the polarization direction of the radio wave transmitted to the sheet.

In the wireless tag communication device according to the embodiment, stable communication can be performed with a plurality of wireless tags provided on one sheet. Hereinafter, the wireless tag communication device according to the embodiment and an image forming apparatus including the wireless tag communication device will be described in detail.

Figure 1:
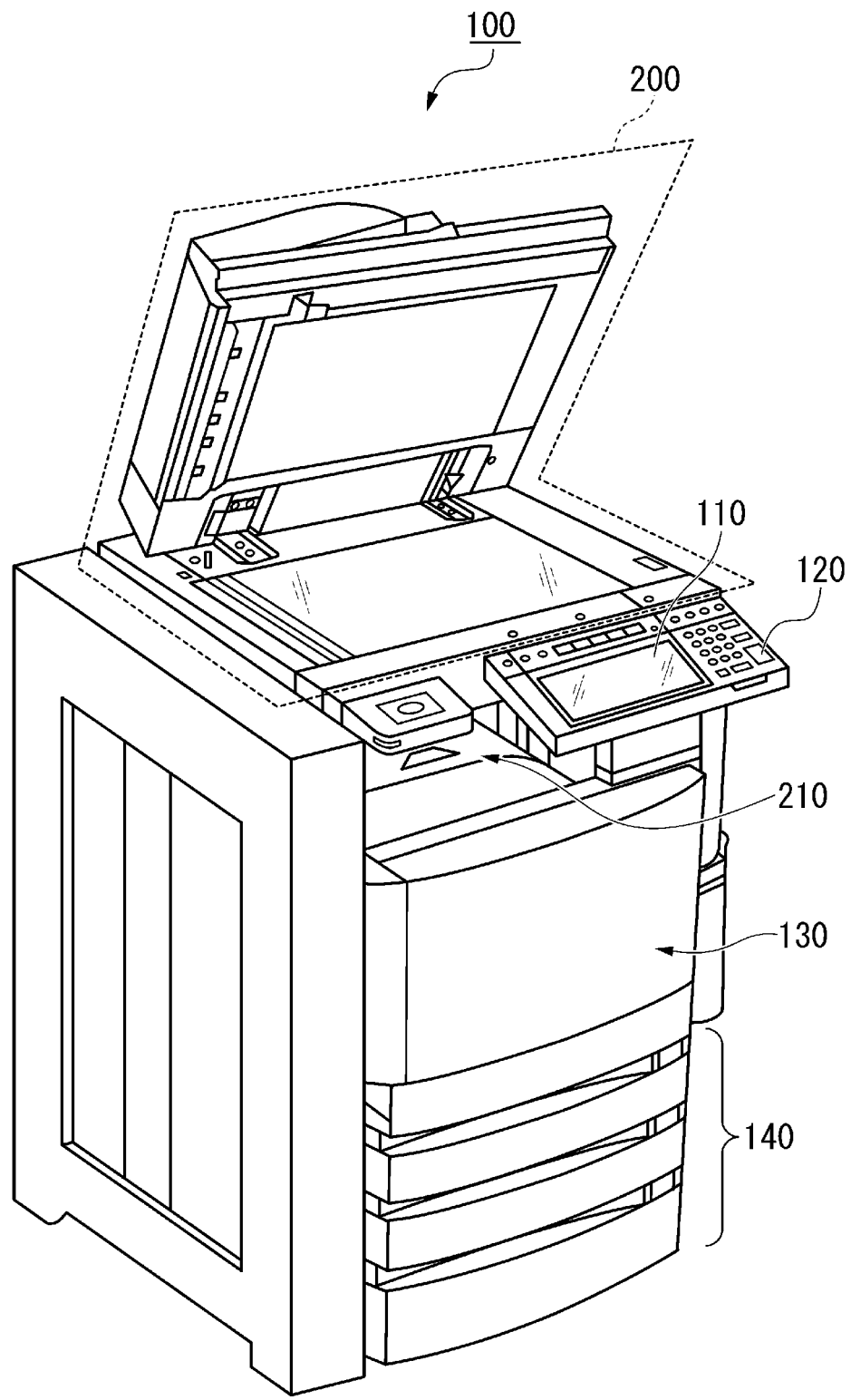
FIG. 1 is an external view showing an example of an overall configuration of an image forming apparatus according to an embodiment.

FIG. 1 is an external view showing an example of an overall configuration of an image forming apparatus 100 according to the embodiment. The image forming apparatus 100 is, for example, a multifunction device. The image forming apparatus 100 includes a display 110, a control panel 120, a printer unit 130, a sheet storage unit 140, and an image reading unit 200. The printer unit 130 of the image forming apparatus 100 may be an electrophotographic device that fixes a toner image, or an inkjet device.

The image forming apparatus 100 forms an image on a sheet using a developer such as a toner. The sheet is, for example, paper or label paper. The sheet may be a sheet attached with a wireless tag. The sheet may be any object as long as the image forming apparatus 100 can form the image on a surface of the object. As the sheet attached with the wireless tag, the wireless tag may be attached to the surface of the sheet, or the wireless tag may be embedded inside the sheet. The wireless tag according to the present embodiment is a wireless tag using a radio frequency identifier (RFID) technique, and is also called an RF tag.

The display 110 is an image display device such as a liquid crystal display or an organic electroluminescence (EL) display. The display 110 displays various kinds of information related to the image forming apparatus 100.

The control panel 120 includes a plurality of buttons. The control panel 120 receives an operation of a user. The control panel 120 transmits a signal corresponding to the operation performed by the user to a control unit of the image forming apparatus 100. The display 110 and the control panel 120 may be configured as an integrated touch panel.

The printer unit 130 forms an image on the sheet based on image information generated by the image reading unit 200 or image information received via a communication path. The printer unit 130 forms the image by, for example, the following processes. The printer unit 130 forms an electrostatic latent image on a photoconductor drum based on the image information. The printer unit 130 forms a visible image by adhering the developer to the electrostatic latent image. The toner is a specific example of the developer. The printer unit 130 transfers the visible image onto the sheet. The printer unit 130 fixes the visible image on the sheet by heating and pressurizing the sheet. The sheet formed with the image may be a sheet stored in the sheet storage unit 140, or a manually fed sheet. The sheet formed with the image is discharged to a paper discharge unit 210.

The sheet storage unit 140 stores the sheet used for image formation in the printer unit 130. In the present embodiment, the sheet storage unit 140 is provided with four paper feed cassettes.

The image reading unit 200 reads the image information to be read based on brightness of light. The image reading unit 200 records the read image information. The recorded image information may be transmitted to another information processing device via a network. The recorded image information may be used to form an image on the sheet by the printer unit 130.

Figure 2:
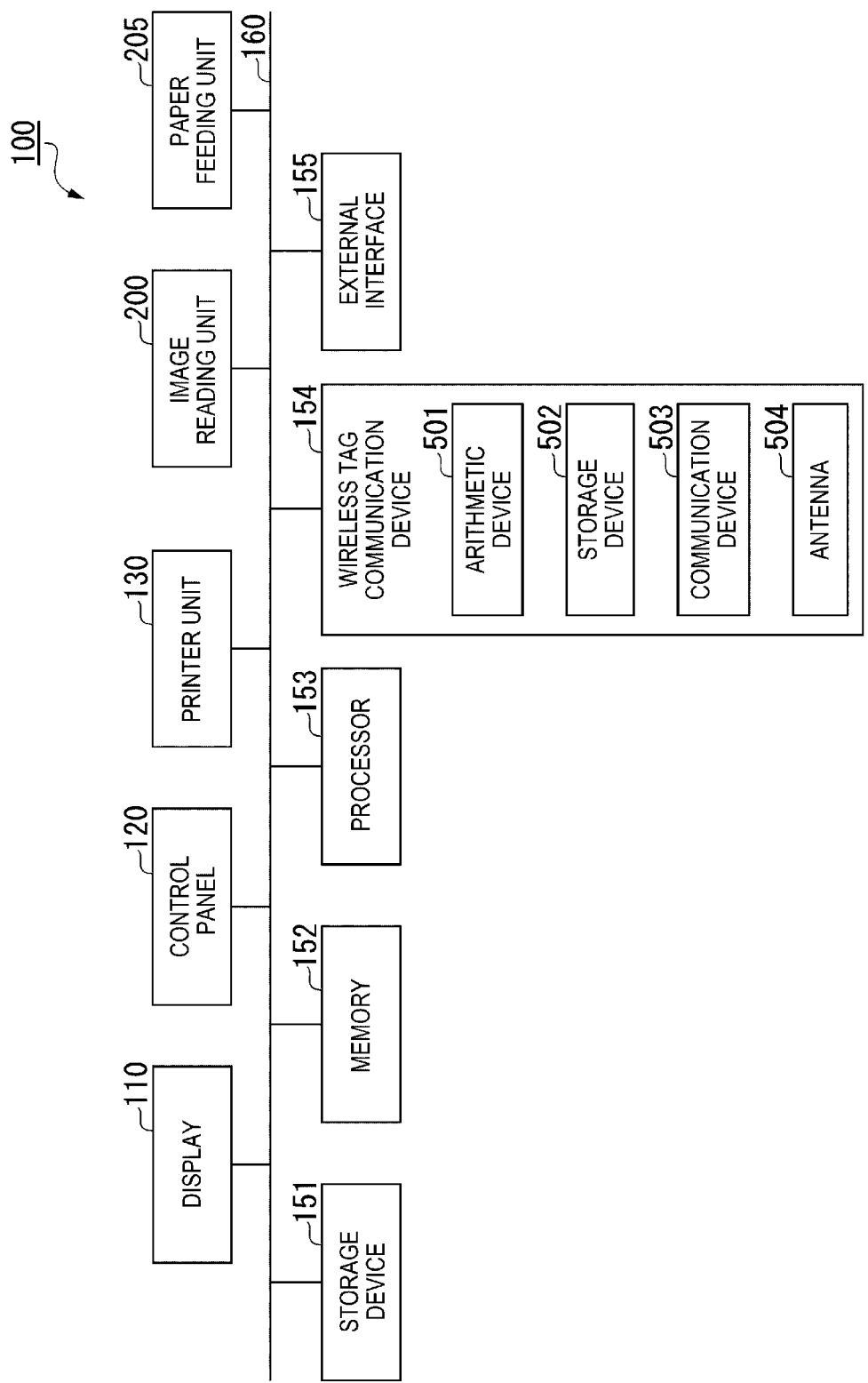
FIG. 2 is a block diagram showing a hardware configuration.

FIG. 2 is a block diagram showing a hardware configuration of the image forming apparatus 100 according to the embodiment. The image forming apparatus 100 includes the display 110, the control panel 120, the printer unit 130, a paper feeding unit 205, a storage device 151, a memory 152, a processor 153, a wireless tag communication device 154, an external interface 155, and the image reading unit 200. Since the display 110, the control panel 120, the printer unit 130, and the image reading unit 200 are described above, description thereof will be omitted. The paper feeding unit 205 is a mechanism that feeds sheets placed in the sheet storage unit 140 and a manual feed tray described later to the printer unit 130. Hereinafter, the storage device 151, the memory 152, the processor 153, the wireless tag communication device 154, and the external interface 155 will be described. The functional units are connected via a system bus 160 in a data-communicable manner.

The storage device 151 is, for example, a hard disk or a solid-state drive (SSD), and stores various kinds of data. The various kinds of data are a print job received from an external communication device and a software program for controlling an operation of each functional unit of the image forming apparatus 100. The print job may be a job related to double-sided printing or a job related to printing of a plurality of sheets. The print job may include image information related to an image to be printed on the sheet.

The memory 152 temporarily stores data used by each functional unit provided in the image forming apparatus 100. The memory 152 is, for example, a random-access memory (RAM). The memory 152 may store digital data generated by the image reading unit 200. The memory 152 may temporarily store the print job of printing the sheet by the printer unit 130 and write information to be written to the wireless tag.

The processor 153 controls the operation of each functional unit of the image forming apparatus 100. The processor 153 executes the process by loading the software program stored in the storage device 151 into the memory 152, and executing the software program. Here, a specific process of the processor 153 will be described with an example.

The processor 153 controls printing on a sheet attached with a wireless tag based on a print job received via the external communication device or the control panel 120. When the print job related to the sheet attached with the wireless tag is received, the processor 153 acquires write information specified in the print job and image information associated with the write information from, for example, a write information server (not shown). The image information associated with the write information is information related to the image to be formed on the sheet. The image information is not required to be associated with the write information. In this case, the image information may be included in the print job. The processor 153 controls the paper feeding unit 205. The paper feeding unit 205 feeds the sheet attached with the wireless tag.

The processor 153 controls the printer unit 130. The printer unit 130 forms, on the sheet, an image indicated by the image information. The sheet formed with the image is discharged to the paper discharge unit 210. The processor 153 communicates with the wireless tag communication device 154. For example, the processor 153 notifies the wireless tag communication device 154 of start of conveying the sheet, and the like.

The wireless tag communication device 154 includes an arithmetic device 501, a storage device 502, a communication device 503, and an antenna 504. The arithmetic device 501 is, for example, a central processing unit (CPU) or an application-specific integrated circuit (ASIC). The storage device 502 is a read-only memory (ROM), a random-access memory (RAM), or the like. The storage device 502 stores a received power intensity (RSSI) of the wireless tag, a timing at which the received power intensity is acquired, identification information (for example, a unique identifier (UID)) for identifying the wireless tag, and the like.

The communication device 503 transmits radio waves in two different polarization directions (a first polarization direction and a second polarization direction). The communication device 503 acquires information from the wireless tag or writes the information to the wireless tag using the antenna 504, which is capable of switching the polarization direction of the radio waves transmitted to the wireless tag. The wireless tag communication device 154 writes the information to the wireless tag provided on the sheet. Further, the wireless tag communication device 154 reads the above identification information from the wireless tag provided on the sheet, and the like. In the following description, the radio wave in the first polarization direction may be simply described as "first polarized wave". Similarly, the radio wave in the second polarization direction may be simply described as "second polarized wave".

Data transmission and reception with another device is performed via the external interface 155. Here, the other device is, for example, an information processing device such as a personal computer, a tablet computer, or a smart device. The external interface 155 operates as an input interface to receive the data or an instruction transmitted from the other device. The instruction transmitted from the other device is the print job or the like. The data transmitted from the other device is the write information, the image information associated with the write information, and the like. Further, the external interface 155 operates as a transmission interface to transmit the data to the other device.

Figure 3:
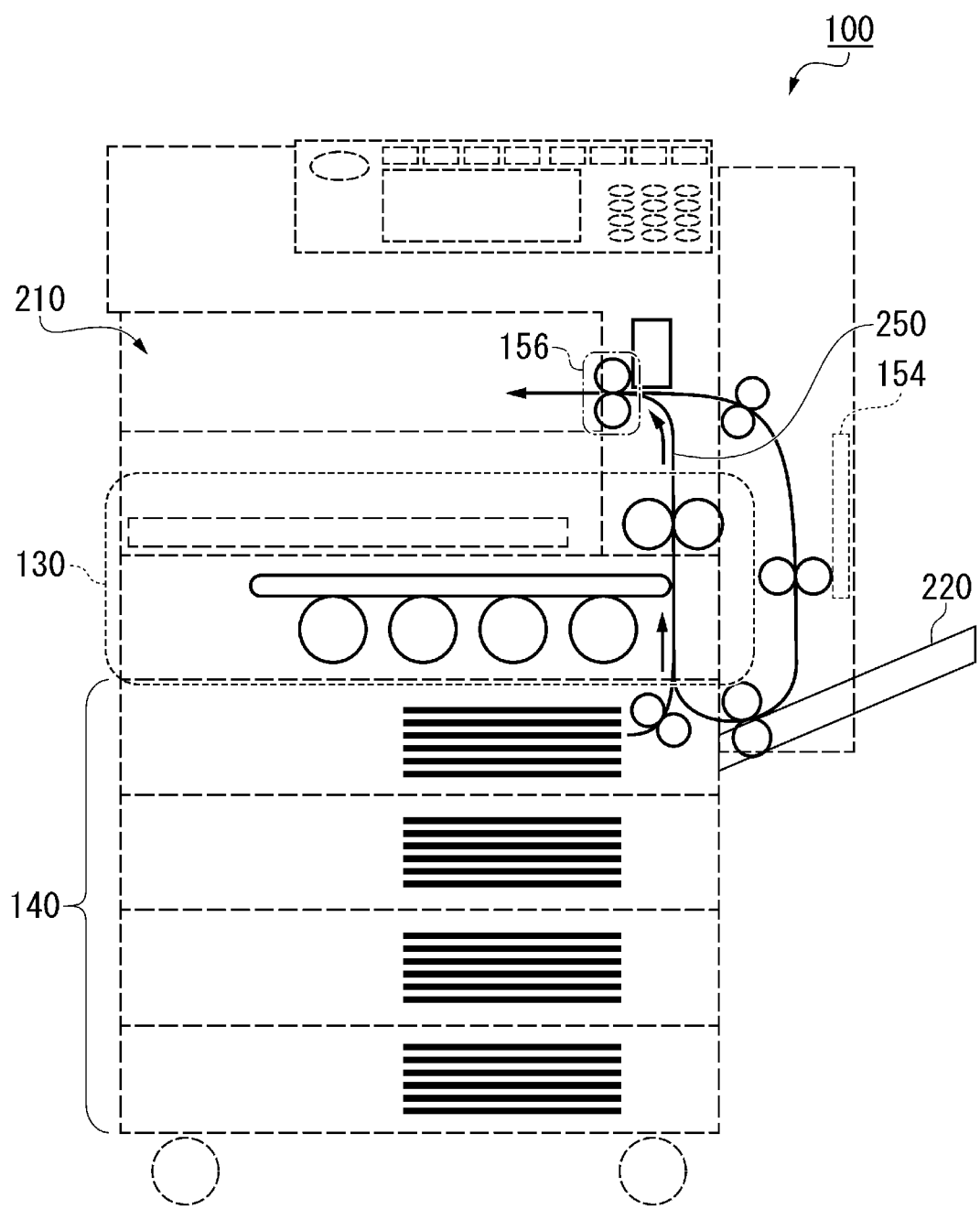
FIG. 3 is a diagram showing a specific example of an internal configuration.

FIG. 3 is a diagram showing an internal configuration of the image forming apparatus 100. FIG. 3 additionally shows a manual feed tray 220. The sheet is conveyed from the sheet storage unit 140 or the manual feed tray 220 along the conveyance path 250, formed with an image by the printer unit 130, and discharged to the paper discharge unit 210 by discharge rollers 156. The wireless tag communication device 154 communicates with the wireless tag during the conveyance along the conveyance path 250.

Next, an example of the sheet provided with the plurality of wireless tags will be described. The wireless tag communication device 154 can transmit the first polarized wave and the second polarized wave as described above. However, in many cases, the appropriate radio wave with respect to the sheet cannot be unconditionally determined but depends on positions on the sheet provided with the wireless tags. Therefore, a manufacturer of the wireless tag communication device 154 or the image forming apparatus 100 including the wireless tag communication device 154 may set recommended polarized waves for various sheets in advance. In order to determine the polarization direction, an appropriate polarized wave acquisition method described below will be performed.

Figure 4A:
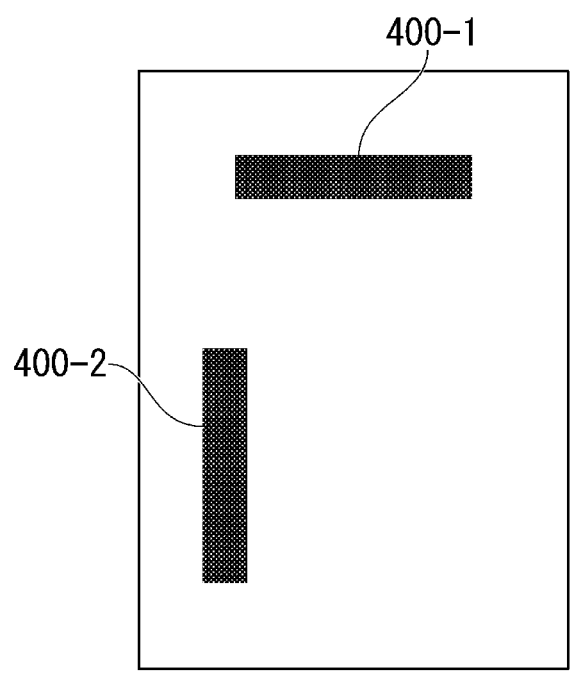
FIG. 4A is a diagram showing a sheet A.

FIGS. 4A, 4B, 4C, and 4D are diagrams showing examples of four types of sheets provided with a plurality of wireless tags. For each of the sheets, a conveyance direction is an upward direction in the drawing. That is, the sheets are conveyed upward in the drawings. In FIGS. 4A, 4B, 4C, and 4D, reference numerals 400-1, 400-2, and 400-3 indicate the wireless tags. FIG. 4A is a diagram showing an example of a sheet provided with two wireless tags 400-1 and 400-2. In the sheet shown in FIG. 4A, the wireless tag 400-1 is provided parallel to the conveyance direction, and the wireless tag 400-2 is provided perpendicular to the conveyance direction. The type of the sheet shown in FIG. 4A may be referred to as "sheet A" in the following description.

Figure 4B:
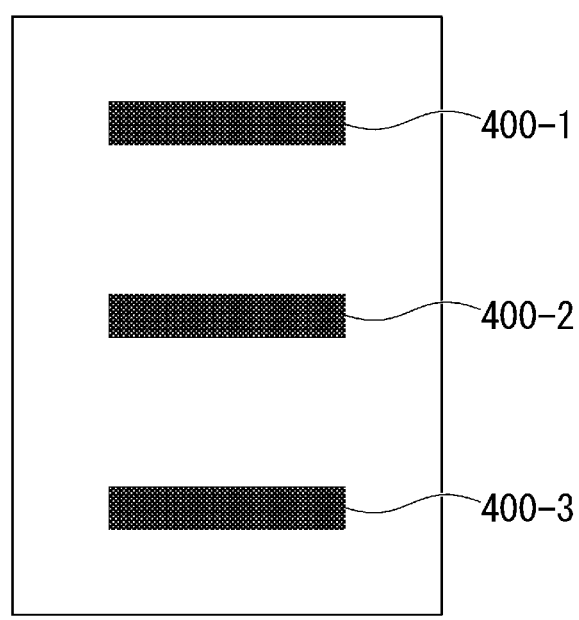
FIG. 4B is a diagram showing a sheet B.

FIG. 4B is a diagram showing an example of a sheet provided with three wireless tags 400-1, 400-2, and 400-3. In the sheet shown in FIG. 4B, the wireless tags 400-1, 400-2, and 400-3 are provided at equal intervals, and all of the wireless tags 400-1, 400-2, and 400-3 are provided perpendicular to the conveyance direction. The type of the sheet shown in FIG. 4B may be referred to as "sheet B" in the following description.

Figure 4C:
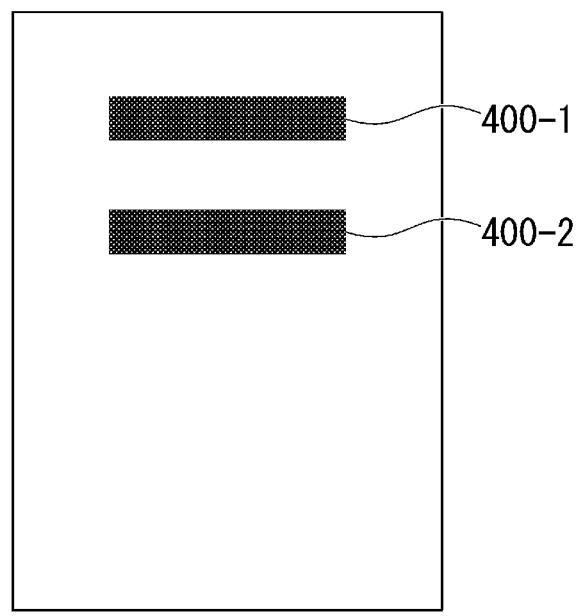
FIG. 4C is a diagram showing a sheet C.

FIG. 4C is a diagram showing an example of the sheet provided with two wireless tags 400-1 and 400-2. In the sheet shown in FIG. 4C, the wireless tags 400-1 and 400-2 are provided with an interval that is narrower than those in FIG. 4B, and both the wireless tags 400-1 and 400-2 are provided perpendicular to the conveyance direction. The type of the sheet shown in FIG. 4C may be referred to as "sheet C" in the following description.

Figure 4D:
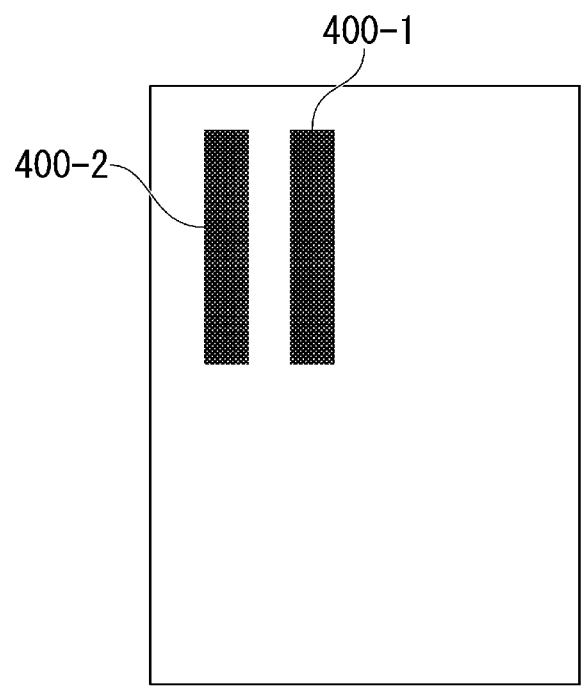
FIG. 4D is a diagram showing a sheet D.

FIG. 4D is a diagram showing an example of a sheet provided with two wireless tags 400-1 and 400-2. In the sheet shown in FIG. 4D, the wireless tags 400-1 and 400-2 are provided closer to a left side and in parallel to the conveyance direction. The type of the sheet shown in FIG. 4D may be referred to as "sheet D" in the following description.

In the following FIGS. 5 to 10, one of the four types of sheets A to D described above and the received power intensity will be described. FIGS. 5 to 10 show, in the form of graphs, results of measurement of the received power intensities by the appropriate polarized wave acquisition method described below. The sheet A is used in FIGS. 5, 7, and 8, and the received power intensities are different in the drawings. The sheet A is used for the sake of convenience in order to simplify the description, and is described as sheets having different properties in FIGS. 5, 7, and 8.

The appropriate polarized wave acquisition method will be described. In the following description, when no response is received from the wireless tag, the received power intensity of the wireless tag is set to 0.

First, the wireless tag communication device 154 acquires, for each of n (n is an integer of 2 or more) wireless tags provided on the sheet, a maximum value $M1(k)$ (k=1 to n) of the received power intensity of the wireless tag when the radio wave is transmitted from the antenna 504 to the sheet in the first polarization direction.

Next, the wireless tag communication device 154 acquires, for each of the wireless tags, a maximum value $M2(k)$ (k=1 to n) of the received power intensity of the wireless tag when the radio wave is transmitted from the antenna 504 in the second polarization direction.

The wireless tag communication device 154 acquires a minimum value m1 of $M1(k)$ (k=1 to n), acquires a minimum value m2 of $M2(k)$ (k=1 to n), and determines the polarization direction along which one of m1 and m2 that is not smaller is acquired as a polarization direction of the radio wave transmitted to the sheet.

The graphs shown in FIGS. 5 to 10 described below are graphs when n=2 or n=3. A vertical axis represents the received power intensity of each wireless tag provided on the sheet, and a horizontal axis represents a time. Further, in a state in which the wireless tag communication device 154 is transmitting the first polarized wave, a sheet of one type is conveyed, and the wireless tag communication device 154 measures the received power intensity. Next, in a state in which the wireless tag communication device 154 is transmitting the second polarized wave, a sheet of the same type as that of the first conveyed sheet is conveyed again, and the wireless tag communication device 154 measures the received power intensity. The first conveyed sheet may be conveyed again, or a sheet that is a sheet of the same type but is different from the first conveyed sheet may be conveyed.

Since the wireless tag communication device 154 transmits the first polarized wave and the second polarized wave in this order as described above, the horizontal axis indicating the time indicates that the first polarized wave and the second polarized wave are transmitted in this order. In FIGS. 5 to 10, the received power intensity of the tag 400-1 provided on each sheet is indicated by a solid line, and the received power intensity of the tag 400-2 provided on the sheet is indicated by a broken line. In FIG. 6, the received power intensity of the tag 400-3 is indicated by a dot-and-dash line.

Next, a maximum value of the received power intensity of the tag 400-1 is $M1(1)$, a maximum value of the received power intensity of the tag 400-2 is $M1(2)$, and a maximum value of the received power intensity of the tag 400-3 is $M1(3)$ when the first polarized wave is transmitted from the antenna 504 of the wireless tag communication device 154. A maximum value of the received power intensity of the tag 400-1 is $M2(1)$, a maximum value of the received power intensity of the tag 400-2 is $M2(2)$, and a maximum value of the received power intensity of the tag 400-3 is $M2(3)$ when the second polarized wave is transmitted from the antenna 504 of the wireless tag communication device 154.

m1 represents a minimum value of $M1(1)$ and $M1(2)$, or a minimum value of $M1(1)$, $M1(2)$, and $M1(3)$. m2 represents a minimum value of $M2(1)$ and $M2(2)$, or a minimum value of M2(1), M2(2), and M2(3). Further, the polarization direction along which the one of m1 and m2 that is not smaller is acquired is determined as the polarization direction of the radio wave transmitted to the sheet. As indicated by symbols M1 and m2, a numerical value (1 or 2) following M or m corresponds to the polarization direction. That is, M1 and m1 are values related to the first polarization direction, and M2 and m2 are values related to the second polarization direction. Based on the above, FIGS. 5 to 10 will be described below.

Figure 5:
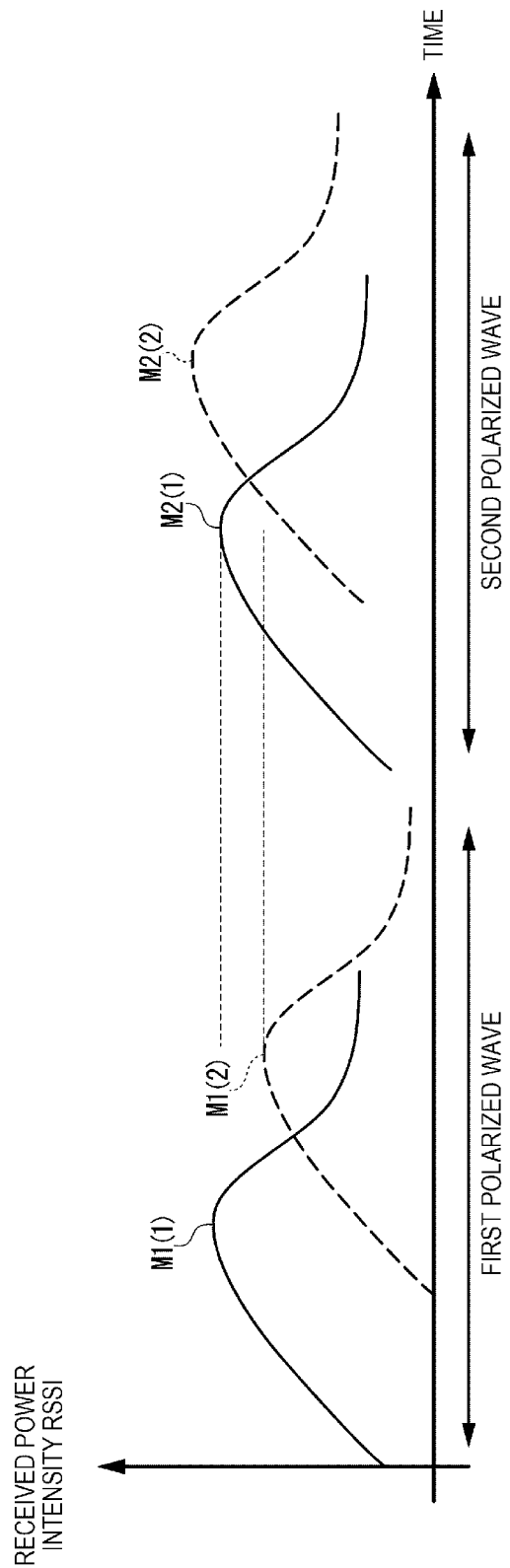
FIG. 5 is a graph showing a sheet and a received power intensity.
Figure 6:
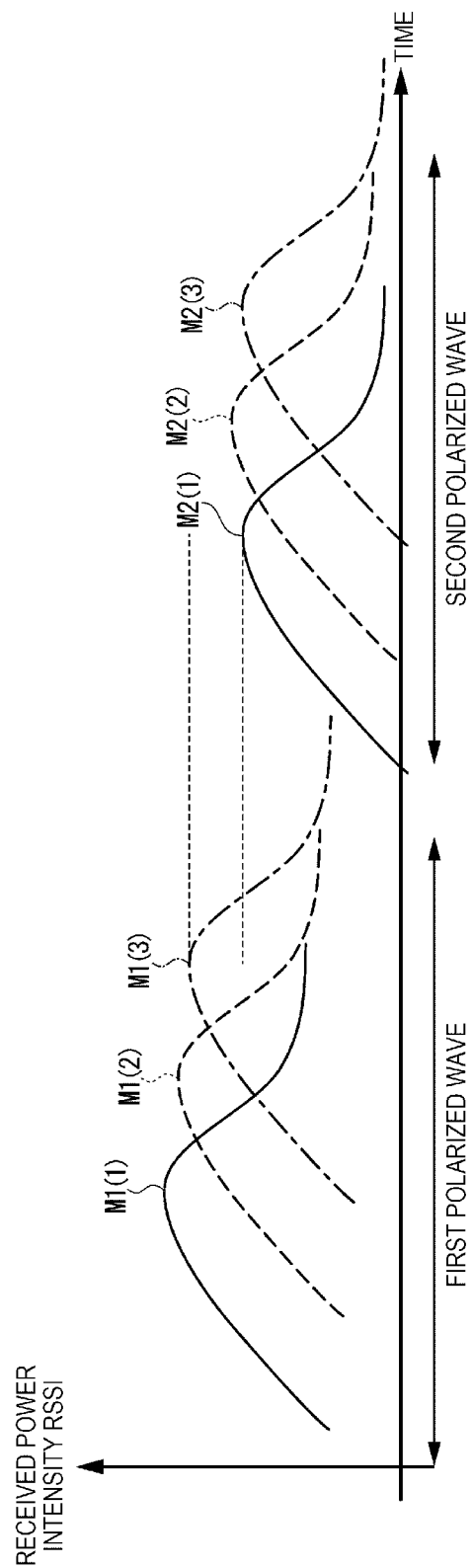
FIG. 6 is a graph showing a sheet and a received power intensity.

FIG. 5 is a graph showing the sheet A and the received power intensity. Since the sheet A is provided with two wireless tags, n=2. As shown in FIG. 5, m1 is M1(2), and m2 is M2(1). The one of m1 and m2 that is not smaller is M2(1). Since the polarization direction along which M2(1) is acquired is the second polarization direction, the second polarization direction is an appropriate polarization direction with respect to the sheet A. Accordingly, the wireless tag communication device 154 determines the second polarization direction as a polarization direction of a radio wave transmitted to the sheet A.

FIG. 6 is a graph showing a sheet B and the received power intensity. Since the sheet B is provided with three wireless tags, n=3. As shown in FIG. 6, m1 is M1(3), and m2 is M2(1). The one of m1 and m2 that is not smaller is M1(3). Since the polarization direction along which M1(3) is acquired is the first polarization direction, the first polarization direction is an appropriate polarization direction with respect to the sheet B. Accordingly, the wireless tag communication device 154 determines the first polarization direction as a polarization direction of a radio wave transmitted to the sheet B.

Before description of the following FIG. 7, a case in which both m1 and m2 are not 0 and no significant difference is between m1 and m2 will be described. When there is no significant difference between m1 and m2, the appropriate polarization direction may be set to either one of the first polarization direction and the second polarization direction, but may also be set as follows.

The wireless tag communication device 154 sorts M1($k$) in ascending order into m1($k$) and sorts M2($k$) in ascending order into m2($k$). Further, the wireless tag communication device 154 increments k from 1, and acquires first k for which |m1($k$)−m2($k$)| is no less than a threshold value m. That is, the wireless tag communication device 154 finds k having a large difference (a difference no less than the threshold value) in order from a smallest maximum value. Further, the wireless tag communication device 154 determines the polarization direction along which one of m1($k$) and m2($k$) that is not smaller is acquired as the polarization direction of the radio wave transmitted to the sheet.

When |m1($k$)−m2($k$)| is less than m even at the maximum value of k, that is, when k=n, the wireless tag communication device 154 acquires the polarization direction along which one of m1(1) and m2(1) that is not smaller is acquired as the appropriate polarization direction. This is because that it is preferable that the minimum received power intensities (m1(1), m2(1)) is not smaller.

Since no significant difference is between m1($j$) and m2($j$) with respect to j<k, the appropriate polarization direction may be set to any one of the first polarization direction and the second polarization direction with respect to m1($j$) and m2($j$). On the other hand, since a significant difference is between m1($k$) and m2($k$), the polarization direction along which the maximum value of the one of m1 and m2 that is not smaller described above is acquired may be determined as the polarization direction of the radio wave transmitted to the sheet. In this way, more stable communication can be performed. The "significant difference", that is, the threshold value m, is appropriately determined depending on performance or a design situation of the wireless tag communication device 154 or the wireless tags, or the like. FIG. 7 will be described based on the above.

Figure 7:
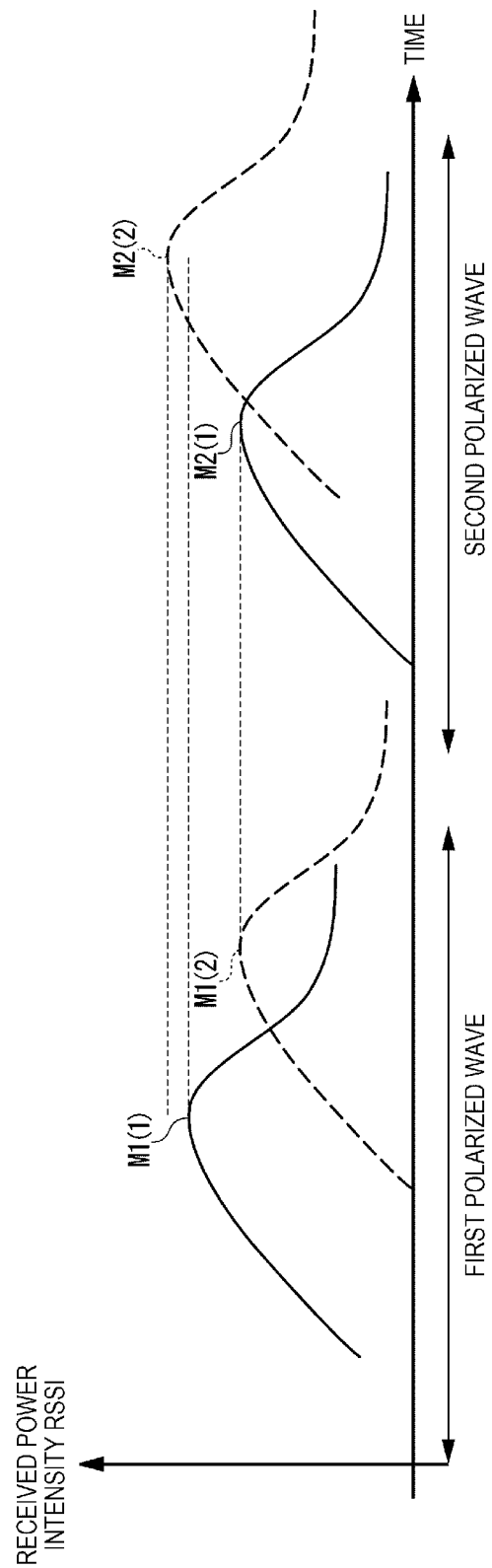
FIG. 7 is a graph showing a sheet and a received power intensity.

FIG. 7 is a graph showing a sheet A and the received power intensity. Since the sheet A is provided with two wireless tags, n=2. As shown in FIG. 7, when M1($k$) is sorted in ascending order into m1($k$), m1(1)=M1(2) and m1(2)=M1(1). When M2($k$) is sorted in ascending order into m2($k$), m2(1)=M2(1) and m2(2)=M2(2).

In FIG. 7, |m1(1)−m2(1)|<m and |m1(2)−m2(2)|≥m. In this case, as described above, the wireless tag communication device 154 acquires the polarization direction along which one of m1(2) and m2(2) that is not smaller is acquired as the polarization direction of the radio wave transmitted to the sheet. The one of m1(2) (=M1(1)) and m2(2) (=M2(2)) that is not smaller is M2(2). Since the polarization direction along which M2(2) is acquired is the second polarization direction, the second polarization direction is the appropriate polarization direction with respect to the sheet A. Accordingly, the wireless tag communication device 154 determines the second polarization direction as the polarization direction of the radio wave transmitted to the sheet A.

Figure 8:
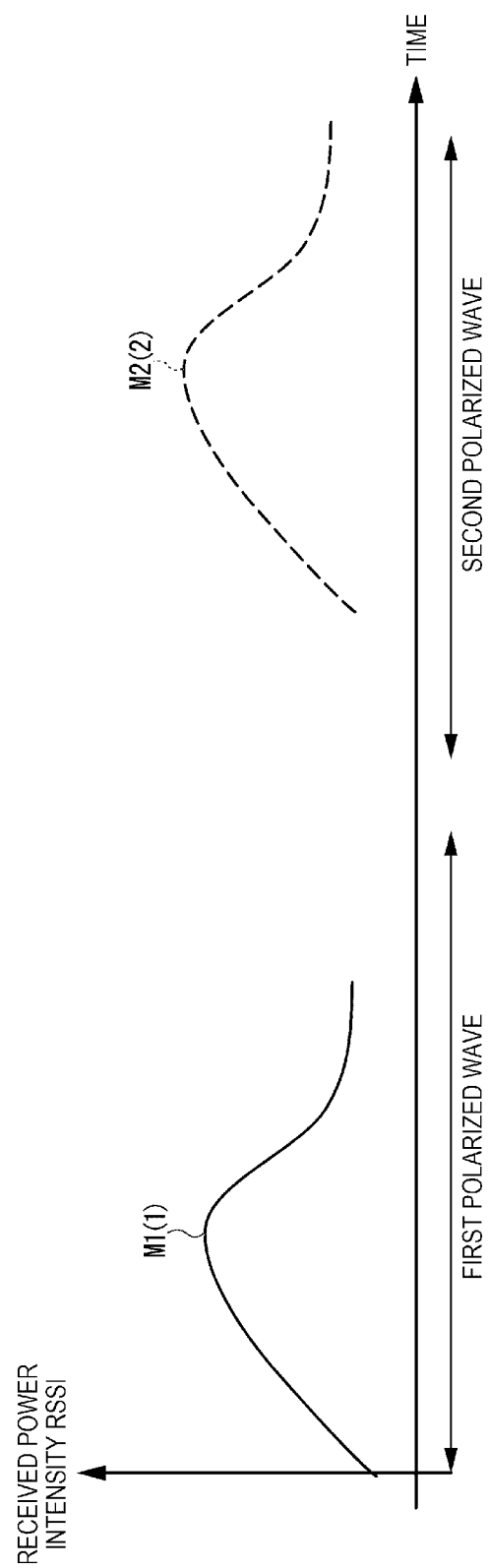
FIG. 8 is a graph showing a sheet and a received power intensity.

Next, a case in which m1=m2=0 will be described with reference to FIG. 8. FIG. 8 is a graph showing a sheet A and the received power intensity. Since the sheet A is provided with two wireless tags, n=2. As shown in FIGS. 8, M1(1)≠0 and M1(2)=0. In addition, M2(1)=0 and M2(2)≠0. Thus, m1=m2=0. In such a case, when only the first polarized wave or only the second polarized wave is acquired as the appropriate polarization direction, the wireless tag communication device 154 cannot communicate with one of the wireless tags. Thus, both the first polarization direction and the second polarization direction are the appropriate polarization direction with respect to the sheet A. Accordingly, the wireless tag communication device 154 determines both the first polarization direction and the second polarization direction as the polarization direction of the radio wave transmitted to the sheet A.

When both the first polarization direction and the second polarization direction are determined as the polarization direction, the wireless tag communication device 154 transmits the first polarized wave, and after writing to the wireless tags, then immediately transmits the second polarized wave to the sheet A.

In order to distinguish between the method of determining the polarization direction along which the one of m1 and m2 that is not smaller is acquired as shown in FIGS. 5 and 6 and the method of using the significant difference as shown in FIG. 7, the former is referred to as "simple minimum value acquisition method".

Figure 9:
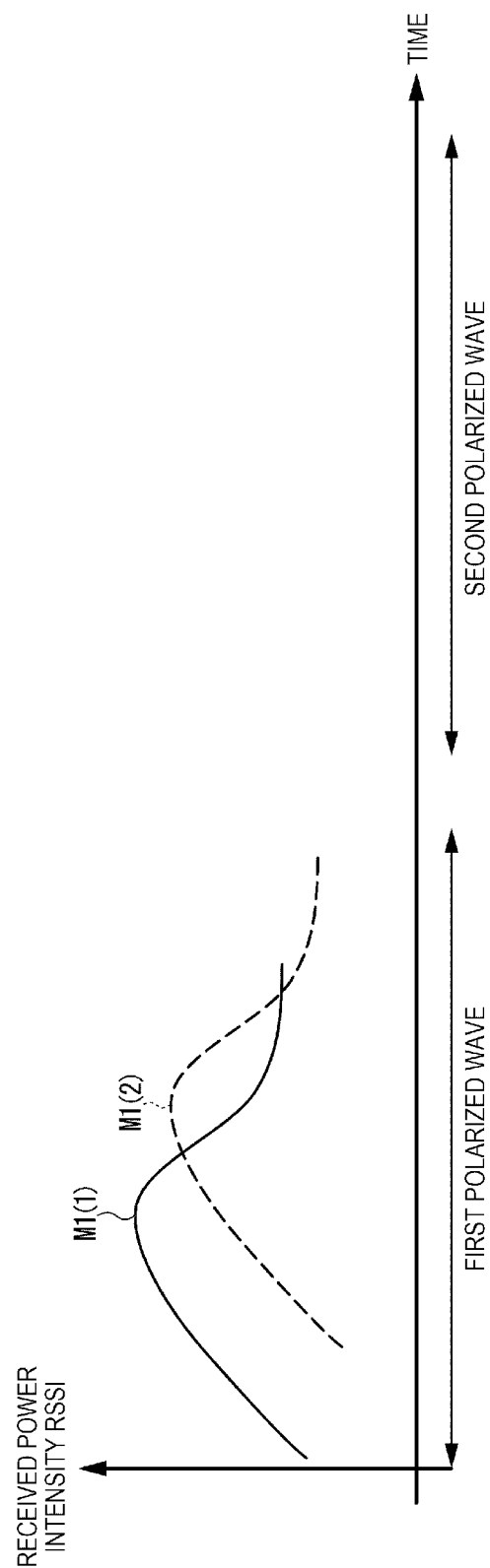
FIG. 9 is a graph showing a sheet and a received power intensity.

Next, a case in which either one of m1 and m2 is 0 will be described with reference to FIGS. 9 and 10. FIG. 9 is a graph showing a sheet C and the received power intensity. Since the sheet C is provided with two wireless tags, n=2. As shown in FIGS. 9, M1(1)≠0 and M1(2)≠0. In addition, M2(1)=0 and M2(2)=0. Thus, m1≠0 and m2=0. In such a case, the first polarization direction is an appropriate polarization direction with respect to the sheet C. Accordingly, the wireless tag communication device 154 determines the first polarization direction as a polarization direction of a radio wave transmitted to the sheet C.

Figure 10:
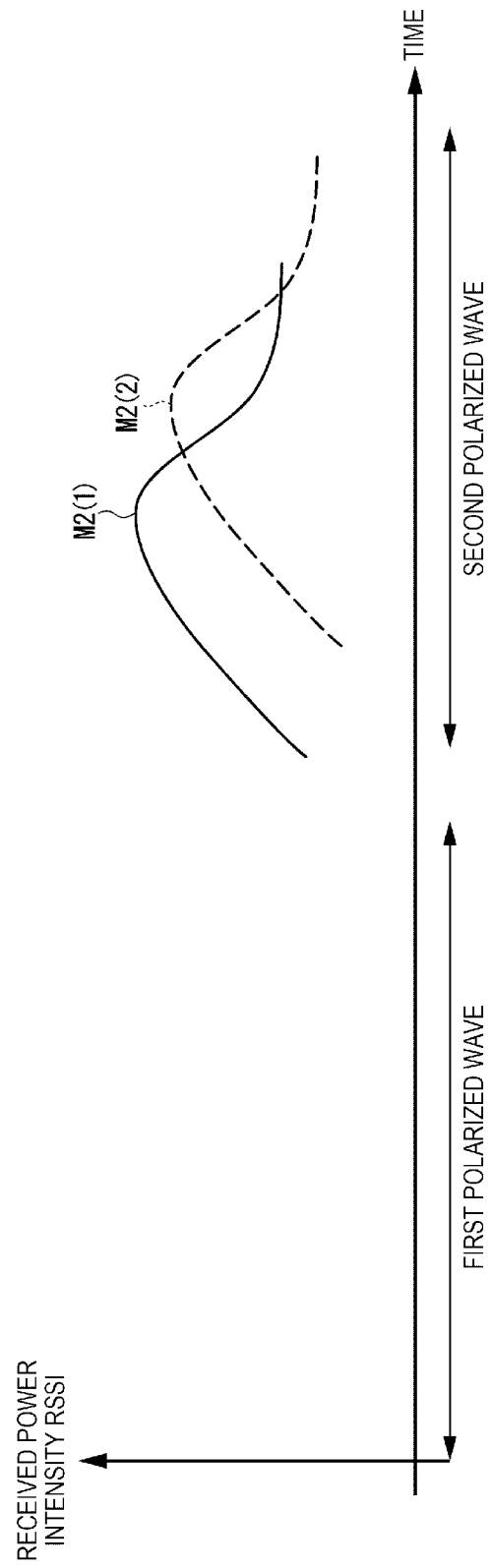
FIG. 10 is a graph showing a sheet and a received power intensity.

FIG. 10 is a graph showing a sheet D and the received power intensity. Since the sheet D is provided with two wireless tags, n=2. As shown in FIGS. 10, M1(1)=0 and M1(2)=0. In addition, M2(1)≠0 and M2(2)≠0. Thus, m1=0 and m2≠0. In such a case, the second polarization direction is an appropriate polarization direction with respect to the sheet D. Accordingly, the wireless tag communication device 154 determines the second polarization direction as a polarization direction of a radio wave transmitted to the sheet D.

Figure 11:
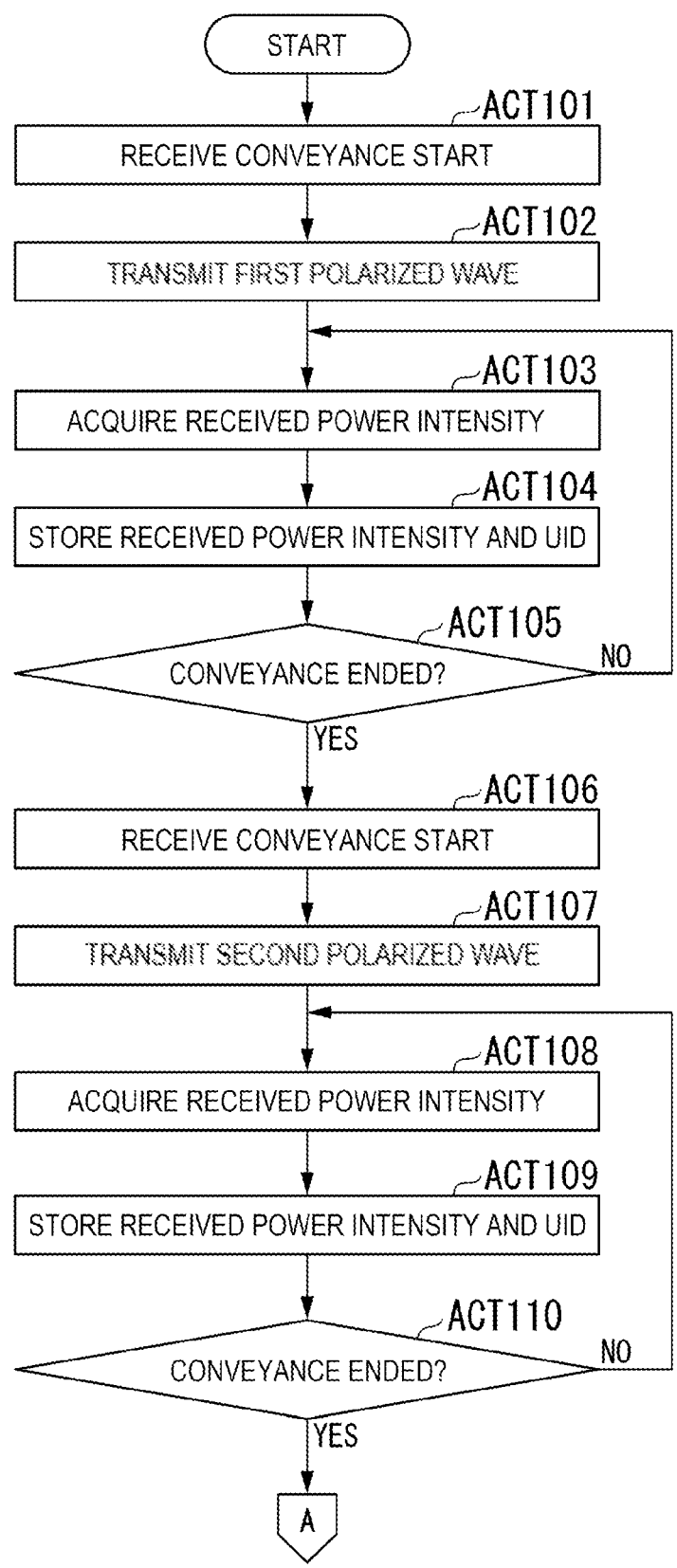
FIG. 11 is a flowchart showing a flow of acquiring an appropriate polarized wave.

Next, the appropriate polarized wave acquisition method will be described using a flowchart. FIG. 11 is a flowchart showing a flow of a process of acquiring an appropriate polarized wave. In the process described below, for ease of understanding the description, the UID for identifying n wireless tags provided on a sheet to be conveyed is set as 1 to n. For example, the UID of the wireless tag 400-1 is set as 1 and the UID of the wireless tag 400-2 is set as 2.

In FIG. 11, the wireless tag communication device 154 receives conveyance start, indicating start of conveyance of the sheet from the processor 153 that controls the paper feeding unit 205 (ACT 101). The wireless tag communication device 154 transmits the first polarized wave (ACT 102). The wireless tag communication device 154 acquires the received power intensity from each wireless tag (ACT 103), and stores the acquired received power intensity and the UID for identifying a wireless tag of an acquisition source in the storage device 502 (ACT 104). For example, the wireless tag communication device 154 stores in a form of (first polarized wave, UID, received power intensity) such that correspondence of the polarized wave, the wireless tag, and the received power intensity can be understood.

In this way, a plurality of (first polarized wave, UID, received power intensity) are acquired for each UID. For example, a plurality of received power intensities are acquired for each UID, such as (first polarized wave, 1, r1), (first polarized wave, 1, r2), . . . , and (first polarized wave, 1, rs). s is an integer of 0 or more, and is a different value for each UID depending on a state of communication with a wireless tag corresponding to the UID.

The wireless tag communication device 154 determines whether conveyance end indicating end of the conveyance of the sheet from the processor 153 is received (ACT 105). When the conveyance end is not received (ACT 105: NO), the process returns to ACT 103. Therefore, the wireless tag communication device 154 intermittently stores combinations of (first polarized wave, UID, received power intensity) when the sheet is being conveyed.

When the conveyance end is received (ACT 105: YES) and a second conveyance start is received (ACT 106), the wireless tag communication device 154 transmits the second polarized wave (ACT 107). The wireless tag communication device 154 acquires the received power intensity from each wireless tag (ACT 108), and stores the acquired received power intensity and the UID for identifying the wireless tag of the acquisition source in the storage device 502 (ACT 109). For example, the wireless tag communication device 154 stores in a form of (second polarized wave, UID, received power intensity) such that correspondence of the polarized wave, the wireless tag, and the received power intensity can be understood.

In this way, similar to the case of the first polarized wave, a plurality of (second polarized wave, UID, received power intensity) are acquired for each UID. For example, a plurality of received power intensities are acquired for each UID, such as (second polarized wave, 1, r1), (second polarized wave, 1, r2), . . . , and (second polarized wave, 1, rs). s is an integer of 0 or more, and is a different value for each UID depending on a state of communication with the wireless tag corresponding to the UID.

The wireless tag communication device 154 determines whether the conveyance end indicating the end of the conveyance of the sheet from the processor 153 is received (ACT 110). When the conveyance end is not received (ACT 110: NO), the process returns to ACT 108. Therefore, the wireless tag communication device 154 intermittently stores combinations of (second polarized wave, UID, received power intensity) when the sheet is being conveyed. The process will be continually described with reference to FIG. 12.

Figure 12:
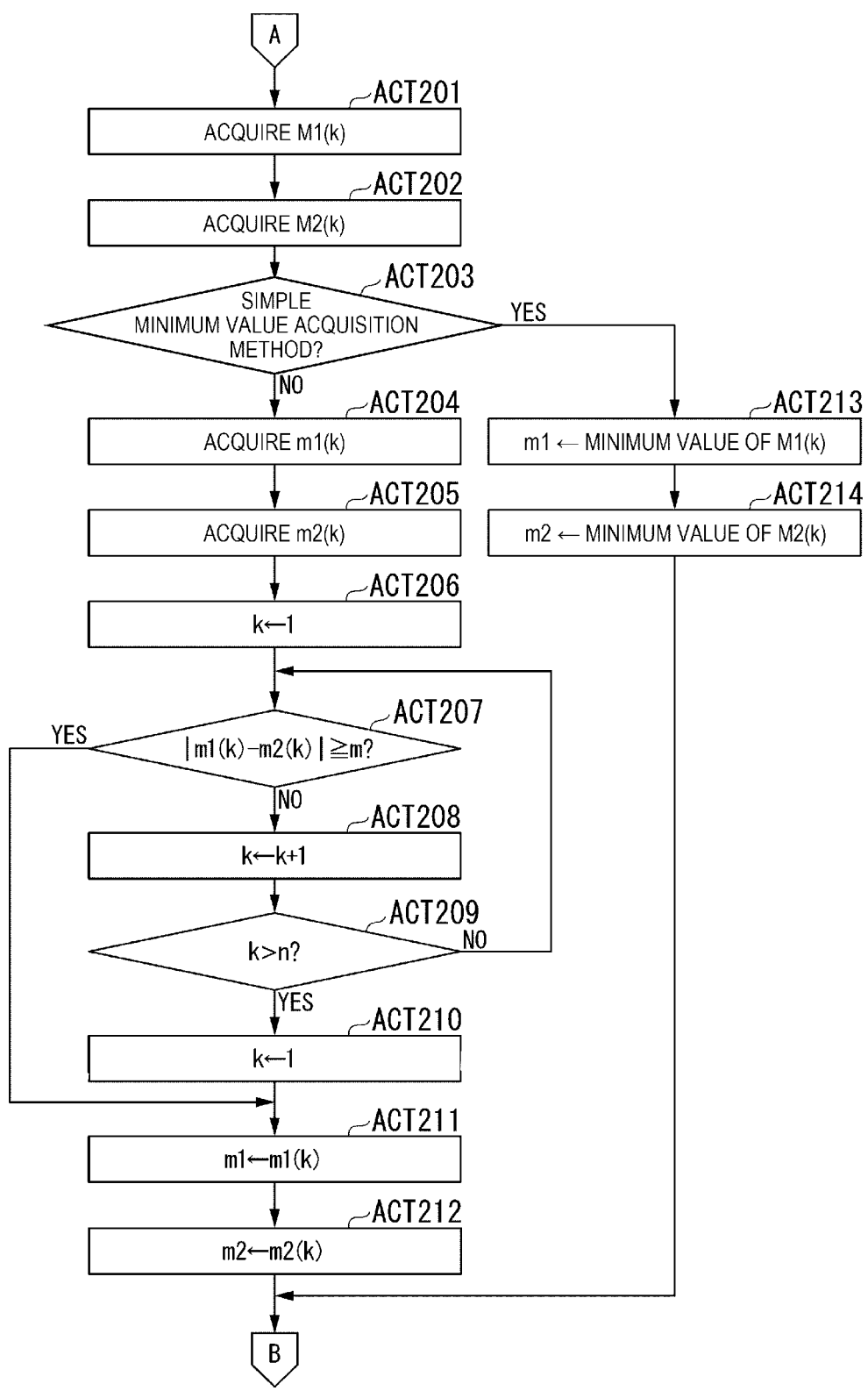
FIG. 12 is another flowchart showing the flow.

In FIG. 12, the wireless tag communication device 154 acquires M1($k$) ($k$=1 to n) (ACT 201). The wireless tag communication device 154 sets M1($k$) to a maximum rq in (first polarized wave, k, rq) (1≤q≤s) when s is 1 or more. When s is 0, M1($k$)=0. Similarly, the wireless tag communication device 154 acquires M2($k$) ($k$=1 to n) (ACT 201). The wireless tag communication device 154 sets M2($k$) to a maximum rq in (second polarized wave, k, rq) (1≤q≤s) when s is 1 or more. When s is 0, M2($k$)=0.

Next, the wireless tag communication device 154 determines whether an appropriate polarized wave is acquired by the simple minimum value acquisition method described in FIGS. 5 and 6 (ACT 203). Here, for example, the wireless tag communication device 154 may store, in advance, a settable flag indicating whether the appropriate polarized wave is acquired by the simple minimum value acquisition method, and may use the flag for determination. In addition, the wireless tag communication device 154 may display an inquiry screen on the control panel 120, and may perform determination according to a content input in response to an inquiry.

When the appropriate polarized wave is acquired by the simple minimum value acquisition method (ACT 203: YES), the wireless tag communication device 154 substitutes the minimum value of M1($k$) into m1 (ACT 213) and substitutes the minimum value of M2($k$) into m2 (ACT 214), and the process proceeds to ACT 301 in FIG. 13.

When the appropriate polarized wave is not acquired by the simple minimum value acquisition method (ACT 203: NO), the method described in FIG. 7 is used. As described in FIG. 7, the wireless tag communication device 154 acquires m1($k$) by sorting M1($k$) in ascending order (ACT 204). Similarly, as described in FIG. 7, the wireless tag communication device 154 acquires m2($k$) by sorting M2($k$) in ascending order (ACT 205). The wireless tag communication device 154 substitutes 1 into k (ACT 206).

The wireless tag communication device 154 determines whether |m1(1)−m2(1)|≥m (ACT 207). Since the difference is significant when |m1(1)−m2(1)|≥m (ACT 207: YES), the wireless tag communication device 154 substitutes m1($k$) into m1 (ACT 211) and substitutes m2($k$) into m2 (ACT 212), and the process proceeds to ACT 301 in FIG. 13.

Since there is a significant difference when |m1(1)−m2(1)|<m (ACT 207: NO), the wireless tag communication device 154 increments k by 1 (ACT 208), and determines whether k>n (ACT 209). That is, whether k exceeds an upper limit is determined. When k≤n (ACT 209: NO), the wireless tag communication device 154 determines whether |m1(1)−m2(1)|≥m again (ACT 207). When k>n (ACT 209: YES), the wireless tag communication device 154 substitutes 1 into k (ACT 210), and the process proceeds to ACT 211 described above. The process will be continually described with reference to FIG. 13.

In FIG. 13, the wireless tag communication device 154 determines whether m1=m2=0 (ACT 301). When m1=m2=0 (ACT 301: YES), the wireless tag communication device 154 determines both the first polarization direction and the second polarization direction as the polarization direction of the radio wave transmitted to the sheet A (ACT 302), and the process is ended.

When m1=m2=0 is not satisfied (ACT 301: NO), the wireless tag communication device 154 determines whether m1≥m2 (ACT 303). When m1≥m2 (ACT 303: YES), the wireless tag communication device 154 determines the first polarized wave direction as the polarization direction of the radio wave transmitted to the sheet (ACT 304), and the process is ended. When m1<m2 (ACT 303: NO), the wireless tag communication device 154 determines the second polarized wave direction as the polarization direction of the radio wave transmitted to the sheet (ACT 305), and the process is ended.

According to the embodiment described above, stable communication with the plurality of wireless tags provided on one sheet can be performed by determining the radio wave in the polarization direction along which the minimum value of the maximum value of the received power intensity is not smaller.

While certain embodiments have been described, these embodiments have been presented by way of example only, and are not intended to limit the scope of the inventions. These embodiments can be implemented in various other forms, and various omissions, substitutions, and changes can be made without departing from the gist of the disclosure. These embodiments and modifications thereof fall within the scope and spirit of the invention and are included in the scope of the invention recited in the claims and the equivalent thereof.

What is claimed is:

1. A wireless tag communication device, comprising:
an antenna configured to switch a polarization direction of a radio wave transmitted to a wireless tag; and
a processor that executes instructions to:
acquire, for each of n, wherein n is an integer of 2 or more, wireless tags provided on a sheet, a maximum value $M1(k)$ ($k$=1 to n) of a received power intensity of the wireless tag when the radio wave is transmitted from the antenna to the sheet in a first polarization direction;
acquire, for each of the wireless tags, a maximum value $M2(k)$ ($k$=1 to n) of a received power intensity of the wireless tag when the radio wave is transmitted from the antenna in a second polarization direction that is different from the first polarization direction;
acquire a minimum value m1 of $M1(k)$ ($k$=1 to n);
acquire a minimum value m2 of $M2(k)$ ($k$=1 to n); and
determine the polarization direction along which one of m1 and m2 that is not smaller is acquired as the polarization direction of the radio wave transmitted to the sheet.

2. The wireless tag communication device according to claim 1, wherein the processor executes further instructions to:
sort $M1(k)$ in ascending order into $m1(k)$, sort $M2(k)$ in ascending order into $m2(k)$, increment k from 1, and acquire k at which $|m1(k)-m2(k)|$ initially becomes no less than a threshold value m, and
determine the polarization direction along which one of $m1(k)$ and $m2(k)$ that is not smaller is acquired as the polarization direction of the radio wave transmitted to the sheet.

3. The wireless tag communication device according to claim 1, wherein the processor executes further instructions to:

when m1=m2=0, determine both the first polarization direction and the second polarization direction as the polarization direction of the radio wave transmitted to the sheet.

4. The wireless tag communication device according to claim 1, wherein n is an integer of 3 or more.

5. The wireless tag communication device according to claim 1, wherein n is an integer of 2.

6. The wireless tag communication device according to claim 1, wherein n is an integer of 3.

7. An image forming apparatus, comprising:
a wireless tag communication device comprising:
an antenna configured to switch a polarization direction of a radio wave transmitted to a wireless tag;
a processor that executes instructions to:
acquire, for each of n, where n is an integer of 2 or more, wireless tags provided on a sheet, a maximum value $M1(k)$ ($k$=1 to n) of a received power intensity of the wireless tag when the radio wave is transmitted from the antenna to the sheet in a first polarization direction;
acquire, for each of the wireless tags, a maximum value $M2(k)$ ($k$=1 to n) of a received power intensity of the wireless tag when the radio wave is transmitted from the antenna in a second polarization direction that is different from the first polarization direction;
acquire a minimum value m1 of $M1(k)$ ($k$=1 to n);
acquire a minimum value m2 of $M2(k)$ ($k$=1 to n); and
determine the polarization direction along which one of m1 and m2 that is not smaller is acquired as the polarization direction of the radio wave transmitted to the sheet;
a conveying component configured to convey the sheet; and
an image forming component configured to form an image on the sheet, wherein
the wireless tag communication device transmits a radio wave to the sheet conveyed by the conveying component.

8. The image forming apparatus according to claim 7, wherein the processor executes further instructions to:
sort $M1(k)$ in ascending order into $m1(k)$, sort $M2(k)$ in ascending order into $m2(k)$, increment k from 1, and acquire k at which $|m1(k)-m2(k)|$ initially becomes no less than a threshold value m, and
determine the polarization direction along which one of $m1(k)$ and $m2(k)$ that is not smaller is acquired as the polarization direction of the radio wave transmitted to the sheet.

9. The image forming apparatus according to claim 7, wherein the processor executes further instructions to:
when m1=m2=0, determine both the first polarization direction and the second polarization direction as the polarization direction of the radio wave transmitted to the sheet.

10. The image forming apparatus according to claim 7, wherein n is an integer of 3 or more.

11. The image forming apparatus according to claim 7, wherein n is an integer of 2.

12. The image forming apparatus according to claim 7, wherein n is an integer of 3.

13. A method for causing a computer to function as a wireless tag communication device comprising an antenna configured to switch a polarization direction of a radio wave transmitted to a wireless tag, the method causing the computer to perform functions comprising:

acquiring, for each of n, wherein n is an integer of 2 or more, wireless tags provided on a sheet, a maximum value $M1(k)$ ($k=1$ to n) of a received power intensity of the wireless tag when the radio wave is transmitted from the antenna to the sheet in a first polarization direction;

acquiring, for each of the wireless tags, a maximum value $M2(k)$ ($k=1$ to n) of a received power intensity of the wireless tag when the radio wave is transmitted from the antenna in a second polarization direction that is different from the first polarization direction;

acquiring a minimum value m1 of $M1(k)$ ($k=1$ to n);

acquiring a minimum value m2 of $M2(k)$ ($k=1$ to n); and determining the polarization direction along which one of m1 and m2 that is not smaller is acquired as the polarization direction of the radio wave transmitted to the sheet.

14. The method according to claim 13, further comprising:

sorting $M1(k)$ in ascending order into $m1(k)$, sorting $M2(k)$ in ascending order into $m2(k)$, incrementing k from 1, and acquiring k at which $|m1(k)-m2(k)|$ initially becomes no less than a threshold value m, wherein determining the polarization direction along which one of $m1(k)$ and $m2(k)$ that is not smaller is acquired as the polarization direction of the radio wave transmitted to the sheet.

15. The method according to claim 13, further comprising:

when m1=m2=0, determining both the first polarization direction and the second polarization direction as the polarization direction of the radio wave transmitted to the sheet.

16. The method according to claim 13, wherein n is an integer of 3 or more.

17. The method according to claim 13, wherein n is an integer of 2.

18. The method according to claim 13, wherein n is an integer of 3.

* * * * *